R. J. SAVAGE & C. E. SCHULTZ.
CANDY MAKING MACHINE.
APPLICATION FILED AUG. 24, 1914.
Reissued Dec. 1, 1914. 13,836.
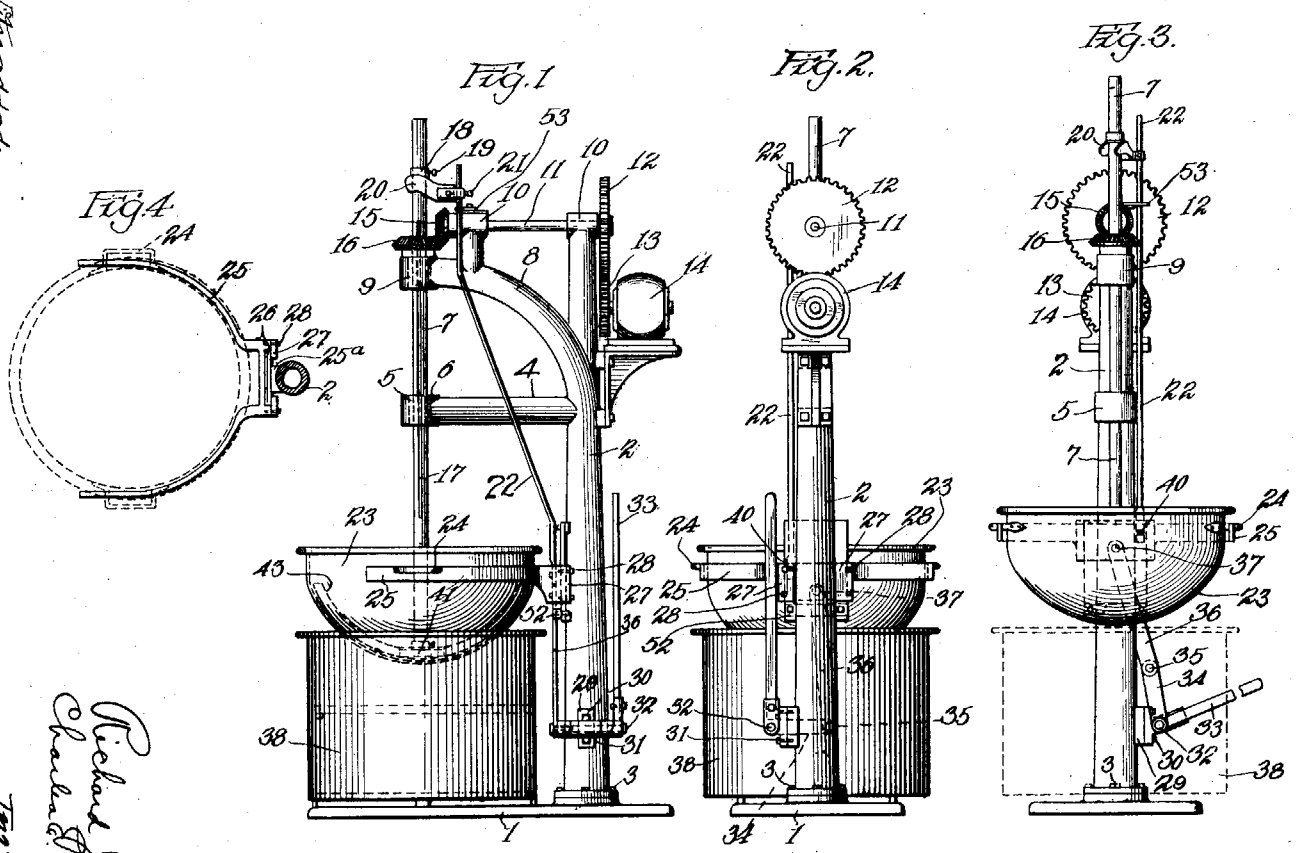
Witnesses:
Leo J. DuMais.
Arthur B. Franke.
Richard J. Savage
Charles E. Schultz
Inventors
By Robt. Mintz and
Elliott R. Goldsmith
Attys.
THE NORRIS PETERS CO., PHOTO-LITHO., WASHINGTON, D. C.

UNITED STATES PATENT OFFICE.

RICHARD J. SAVAGE AND CHARLES E. SCHULTZ, OF CHICAGO, ILLINOIS.

CANDY-MAKING MACHINE.

13,836. Specification of Reissued Letters Patent. Reissued Dec. 1, 1914.

Original No. 1,040,427, dated October 8, 1912, Serial No. 681,523. Application for reissue filed August 24, 1914. Serial No. 858,377.

*To all whom it may concern:*

Be it known that we, RICHARD J. SAVAGE and CHARLES E. SCHULTZ, both citizens of the United States, and residing at Chicago, Illinois, have invented certain new and useful Improvements in Candy-Making Machines, of which the following is a specification.

The primary objects of this invention are to provide means whereby the kettle containing the candy which is being cooked can be quickly lifted away from the fire or flame and moved to a point where the contents will no longer cook, in a very short space of time; and, also, to provide means whereby the kettle and the stirrer-head may be moved simultaneously toward or away from the fire, both the kettle and the stirrer-head being moved in unison and actuated from a single source of power.

In the drawings Figure 1 is a side elevation of the machine, showing the kettle in lowered position; Fig. 2 is an elevation similar to Fig. 1 at an angle of 90 degrees to the view of Fig. 1 looking toward the left in said figure; Fig. 3 is an elevation looking toward the right in Fig. 1; and Fig. 4 is a top plan view showing the wish-bone or device for supporting the kettle.

The base 1 is adapted to rest upon the floor, and to said base the post 2 is secured by bolts 3. The arm 4 is secured to the post and is provided at its outer extremity with the head 5, which is perforated at 6, the shaft 7 being adapted to rotate within said perforation 6 as a bearing. The post 2 also carries an arm 8 which provides a bearing 9 for said shaft 7, which shaft 7 carries the dasher by which the stirring of the candy is effected.

Carried upon a bearing 10 supported by the post 2 is a shaft 11 which carries a gear 12 at one end, which gear meshes with and is driven by another gear 13 fixed upon the shaft of the motor 14. The shaft 11 may, however, be driven by a belt or any other suitable source of power. At its inner end shaft 11 carries a beveled gear 15 which meshes with and drives the beveled gear 16, which beveled gear 16 is rotatable in the head 9. Gear 16 carries a vertical feather (not shown) adapted to be received within the spline 17 on shaft 7. Adjacent its upper end the shaft 7 carries a collar 18 which is fastened to the shaft 7 by the set-screw 19, and said collar 18 limits the downward movement of shaft 7 by engaging the bifurcated yoke 20. Said yoke 20 is secured by bolts 21 to the rod 22.

The kettle 23 is provided with handles by which said kettle may be lifted or carried to any desired position or retained within the wishbone or yoke 25. To the post 2 the blocks 25[a] are bolted, and a strap or guide 26 extends vertically along the side of the post 2. Plates 27 are secured by bolts 28 to the wish-bone 25 so as to lock the same to the strap 26, and thus the wish-bone 25 is permitted to have a rising and falling movement but is retained upon the post. As best shown in Fig. 4, the wish-bone 25 comprises two arms each united to the other at one end, and separated from each other at the opposite ends, the kettle 23 being adapted to be lifted out at the open end, *i. e.*, the left end, Fig. 4.

The bracket 29 is secured by bolts 30 to post 2 and bears a hub 31 through which the shaft 32 passes. On one end of said shaft is fixed the lever 33 and at the other end is the crank-arm 34. The pivot or pin 35 connects the link 36 to the crank-arm 34. At its upper end the link 36 is connected by pin 37 to the wish-bone. The fire by which the material contained within the kettle 23 is cooked, is retained within the heater 38, the fuel being either coal, coke, or gas, as may be desired.

When the parts are as shown in the position indicated in Figs. 1 and 2, kettle 23 is allowed to be in its lowermost position and as near to the fire as possible; but if the lever 33 be moved toward the left, Fig. 2, and to the position shown in Fig. 3, the crank-arm 34 and the link 36 act as a pair of toggle-arms and quickly raise the kettle away from the fire, lifting the same to the position shown in Fig. 3. At the same time that the kettle is being lifted, the rod 22 and the bracket 20 carried thereby are also raised, since said rod 22 is fastened at 40 to the wish-bone 25, and the shaft 7 and connected parts are given a rising and falling movement corresponding with the raising or lowering of the kettle 23. The gear 16 and the driving mechanism are not raised and lowered, but because of the spline and feather connection between gear 16 and shaft 7, the shaft will continue to revolve so long as the motor is in operation, regardless of the position of the kettle 23. The kettle can thus be removed very quickly from the fire while the stirring apparatus is still rotating, and both the kettle and the stirrer shaft 7 which projects thereinto are raised or lowered simultaneously and in unison by the operation of lever 33.

To the bottom of the shaft 7 there is secured the dasher 43, which dasher is adapted to scrape the bottom of the kettle and to stir its contents. Said dasher is more particularly described in our original Patent No. 1,040,427, but is only conventionally shown herein, having been made the subject-matter of a divisional application filed June 24, 1912, as Serial No. 705,456, which matured into Patent No. 1,104,936, granted July 28, 1914.

When the parts are in the position shown in Fig. 3, the pin 35 is carried beyond the line connecting pins 32 and 37. The movement of the link 36 toward the right, Fig. 3, being limited by the notched stop 52, it is obvious that the kettle is locked in upward position when the parts are in the position shown in said Fig. 3. The bearing 10 supports the arm 53 through a perforation in which said rod 22 is adapted to slide. Said arm 53, therefore, acts as a guide to control said rod 52 and prevent unnecessary vibration of the same.

It will be observed that the apparatus for raising the kettle acts very quickly upon the kettle, this being very desirable in any machine used for cooking candy or other articles containing sugar. In this art instantaneous removal of the candy from the fire is often necessary, and it is often desirable to permit the candy to cook until the very instant that it begins to boil, then to stop the cooking and to lift the kettle and its contents away from the heat. As previously stated, however, the raising or lowering of the kettle does not affect the action of the stirring apparatus, and even though the kettle be lifted away from the fire, its contents may still be stirred, and burning, caking, or granulating of the contents prevented. The dasher 43, together with the stirrer shaft 7 which carries the same, will be actuated simultaneously and will move in unison with the kettle, for the shaft 7 and the wish-bone 25 are both connected to and actuated by the lever 33. When the lever 33 is rocked to the position of Fig. 3, the kettle 23 and the shaft 7 are both simultaneously elevated, moving in unison and at the same rate of speed, but, obviously, the rotation of the shaft 7 is not interfered with by the vertical movement of the kettle 23, for the gear 16 will continue to drive the shaft whether the shaft be moving vertically or not, and regardless of the height of the shaft.

Although but one specific embodiment of the invention is shown in the drawings and described in the specification, it is obvious that many changes in details of construction may be made without departing from the scope of the invention.

We claim as our invention:

1. A candy-making machine, comprising a kettle, means adapted to support the same above the fire, an operating lever, and toggle-arms intermediate said lever and said supporting means, whereby said lever is adapted to raise or lower said kettle.

2. A candy-making machine, comprising a kettle, means supporting the same above the fire, a shaft projecting into the kettle, means extending from said supporting means to said shaft, a lever, and a pair of toggle-arms intermediate said lever and said supporting means, whereby said lever is adapted to raise and lower said kettle and said shaft.

3. A candy-making machine, comprising a kettle, a yoke by which said kettle is supported, a base to which the arms of said yoke are united, a shaft, means intermediate said shaft and connected to said base, whereby rotation of said shaft causes movement of said base, and means for rotating said shaft.

4. A candy-making machine, comprising a kettle, a yoke supporting the same, a base to which the arms of said yoke are united, a guide in connection with which said yoke is adapted to slide, a shaft, toggle-arms intermediate said shaft and connected to said base, and means for rocking said shaft.

5. A candy-making machine, comprising a kettle, a yoke supporting the same, a base to which the arms of said yoke are united, a rotating shaft, an arm adapted to raise or lower the same and connected to said kettle-supporting means, and means for reciprocating said kettle-supporting means.

6. A candy-making machine, comprising a kettle, a yoke by which said kettle is supported, a rotating shaft, an arm adapted to raise or lower the same, said arm being connected to said kettle-supporting means, an operating lever, and means intermediate said lever and said kettle-supporting means, whereby said lever is adapted to raise or lower said kettle and said rotating shaft.

7. A candy-making machine, comprising a heater, a kettle, a dasher, driving means operatively connected with the dasher, and unitary means for moving the kettle and the dasher toward and away from the heater while the dasher is operatively connected with its driving means.

8. A candy-making machine, comprising a kettle, a dasher therefor, unitary means carrying the kettle and the dasher, and mechanism for raising and lowering said unitary carrying means adapted at all times to support said means.

9. A candy-making machine, comprising a kettle, a vertically-moving yoke supporting the kettle, a vertically-disposed stirrer shaft extending into the kettle, an arm fixed to said yoke and extending upwardly therefrom for supporting the stirrer shaft, and a guide with which the upper end of said arm is slidingly engaged.

10. A candy-making machine comprising a standard, a heater, a kettle, one of said parts being movable, a dasher which acts within the kettle, and means to separate the kettle and the heater without interrupting the action of the dasher.

11. A candy-making machine comprising a kettle, a heater, a slidably mounted yoke adapted to support the kettle above the heater, and means to reciprocate said yoke and thereby raise or lower said kettle.

12. A candy-making machine comprising a kettle, a heater, a yoke adapted to support said kettle above said heater, said yoke comprising a pair of arms each united to the other at one end and separated from each other at the opposite end, and means to raise or lower the yoke.

13. A candy-making machine comprising a kettle, means adapted to support the same above the fire, an operating lever, and means intermediate said lever and said kettle-supporting means and adapted to translate the movement of said lever into vertical movement of said supporting means.

14. A candy-making machine comprising a kettle, means supporting the same above the fire, a rotating shaft bearing a dasher and projecting into the kettle, an operating lever, and means connecting said lever both to said kettle-supporting means and to said dasher shaft, and adapted to translate the movement of said lever into rising and falling movement of said kettle and of said dasher shaft.

15. A candy-making machine comprising a kettle, means adapted to support the same above the fire, a rotating dasher shaft, means adapted to raise or lower said dasher shaft, means for reciprocating said kettle-supporting means, said last-mentioned means being connected also to said means adapted to raise or lower the dasher shaft.

16. A candy-making machine comprising a standard, a heater, a kettle, one of said parts being movable, a dasher which acts within the kettle, and means to separate the kettle and the heater, said last-mentioned means being adapted to operate while the dasher continues to act.

In testimony whereof we have hereunto affixed our names in the presence of two witnesses.

RICHARD J. SAVAGE.
CHARLES E. SCHULTZ.

Witnesses:
S. J. CENEK,
MAY D. FLYNN.

Copies of this patent may be obtained for five cents each, by addressing the "Commissioner of Patents, Washington, D. C."